(12) United States Patent
Lin et al.

(10) Patent No.: US 11,831,244 B2
(45) Date of Patent: Nov. 28, 2023

(54) RESONANT CONVERTER HAVING PRE-CONDUCTION MECHANISM FOR REALIZING WIDE OUTPUT VOLTAGE RANGE

(71) Applicant: National Taiwan University of Science and Technology, Taipei (TW)

(72) Inventors: Jing-Yuan Lin, New Taipei (TW); Hsuan-Yu Yueh, Taoyuan (TW); Yi-Feng Lin, Yilan County (TW); Che-Yu Chang, Yilan County (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 159 days.

(21) Appl. No.: 17/682,042

(22) Filed: Feb. 28, 2022

(65) Prior Publication Data

US 2023/0155511 A1 May 18, 2023

(30) Foreign Application Priority Data

Nov. 12, 2021 (TW) .................................. 110142130

(51) Int. Cl.
*H02M 3/335* (2006.01)
*H02M 3/00* (2006.01)

(52) U.S. Cl.
CPC ......... *H02M 3/33576* (2013.01); *H02M 3/01* (2021.05); *H02M 3/33573* (2021.05)

(58) Field of Classification Search
CPC .... H02M 3/01; H02M 3/015; H02M 3/33569; H02M 3/33573; H02M 3/33576; H02M 3/33584; H02M 3/33592; Y02B 70/10
See application file for complete search history.

(56) References Cited

U.S. PATENT DOCUMENTS

| 9,178,438 B2 | 11/2015 | Fu et al. |
| 9,819,272 B2 | 11/2017 | Perreault et al. |
| 9,853,550 B2 | 12/2017 | Perreault et al. |
| 11,043,901 B2 | 6/2021 | Lin et al. |

(Continued)

FOREIGN PATENT DOCUMENTS

| CN | 101577494 B | 1/2013 |
| CN | 104426376 B | 4/2017 |

(Continued)

*Primary Examiner* — Fred E Finch, III
(74) *Attorney, Agent, or Firm* — Li & Cai Intellectual Property (USA) Office

(57) ABSTRACT

A resonant converter having a pre-conduction mechanism for realizing a wide output voltage range is provided. The resonant converter includes a first circuit and a second circuit. The first circuit includes a plurality of primary-side switches. The plurality of primary-side switches includes a first high-side switch, a second high-side switch, a first low-side switch and a second low-side switch. The second circuit includes a plurality of secondary-side switches. The plurality of secondary-side switches includes a third high-side switch, a fourth high-side switch, a third low-side switch and a fourth low-side switch. When the second low-side switch and the first low-side switch are turned on and a current time reaches a preset on time, the fourth high-side switch and the third low-side switch are turned on.

7 Claims, 14 Drawing Sheets

(56) References Cited

U.S. PATENT DOCUMENTS

| | | | |
|---|---|---|---|
| 11,705,815 B1* | 7/2023 | Shi | H02M 3/01 |
| | | | 363/17 |
| 2015/0229225 A1 | 8/2015 | Jang et al. | |
| 2019/0393769 A1* | 12/2019 | Wei | H02M 3/33592 |
| 2020/0287471 A1* | 9/2020 | Huang | H02M 3/33561 |
| 2020/0313443 A1 | 10/2020 | ElMenshawy et al. | |
| 2021/0028712 A1 | 1/2021 | Yu et al. | |
| 2023/0073462 A1* | 3/2023 | Huang | H02M 1/0058 |
| 2023/0076528 A1* | 3/2023 | Huang | H02M 3/33571 |

FOREIGN PATENT DOCUMENTS

| | | |
|---|---|---|
| CN | 111490683 B | 3/2021 |
| TW | I509969 B | 11/2015 |
| TW | M597537 U | 6/2020 |
| TW | 202121811 A | 6/2021 |

\* cited by examiner

RESONANT CONVERTER HAVING PRE-CONDUCTION MECHANISM FOR REALIZING WIDE OUTPUT VOLTAGE RANGE

CROSS-REFERENCE TO RELATED PATENT APPLICATION

This application claims the benefit of priority to Taiwan Patent Application No. 110142130, filed on Nov. 12, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a resonant converter, and more particularly to a resonant converter having a pre-conduction mechanism for realizing a wide output voltage range.

BACKGROUND OF THE DISCLOSURE

In recent years, global energy sources are gradually depleting and a price of oil has soared, causing a great impact on internal combustion engine vehicles. In order to effectively reduce our dependence on oil as the energy source for the internal combustion engine vehicles, electric vehicles have been researched and developed. Electric energy is used as the energy source of the electric vehicles. Therefore, if internal combustion engine vehicles are replaced with electric vehicles, fuel consumption and harmful gas emissions can be significantly reduced.

A voltage of a battery of an electric vehicle can be charged from a low value by a charging pile. In a pre-charge operation, a charging current supplied to the battery of the electric vehicle can be increased to a maximum current value by the charging pile according to the voltage of the battery. In a constant current mode, the battery can be quickly charged by the charging pile. When the voltage of the battery is charged to a maximum voltage value, the charging pile enters a constant voltage mode. In the constant voltage mode, the charging pile decreases the charging current supplied to the battery of the electric vehicle.

The charging pile must provide different charging currents within a wide current range such that the voltages of the batteries of the electric vehicles can be charged to respectively reach different voltage values falling within a wide output voltage range. Therefore, converters of the charging piles must have an excellent voltage regulation function. Switch components of the converters such as LLC resonant convertors can be switched at a high frequency and volumes of the LLC resonant convertors can be smaller than other types of the converters. The LLC resonant convertors can be used in high power applications, where they can be controlled in different manners so as to improve voltage regulation performances thereof. When voltages of the switch components of the LLC resonant convertor are zero values, currents falling within the wide current range are supplied in the LLC resonant convertor such that the switch components of the LLC resonant convertor can be switched. Therefore, the LLC resonant convertors are widely used in the charging piles of the electric vehicles.

The LLC resonant converter may be a phase-shifted full bridge LLC resonant converter. When phases of signals of the LLC resonant converter are shifted excessively and a voltage of a low-side switch of the LLC resonant converter is a zero value, the low-side switch cannot be switched, so that temperatures of the switch components of the LLC resonant converter continually increase. Under this condition, a quality factor of a resonant tank of the LLC resonant converter is increased such that a slope of a voltage gain curve of the LLC resonant converter increases, thereby reducing phase shift angles of the signals of the switch components. As a result, the LLC resonant converter can supply voltages falling within the wide output voltage range. However, a resonant inductor and a transformer of the LLC resonant converter are more easily damaged as the quality factor increases, so that an efficiency of the LLC resonant converter is reduced.

SUMMARY OF THE DISCLOSURE

In response to the above-referenced technical inadequacies, the present disclosure provides a resonant converter having a pre-conduction mechanism for realizing a wide output voltage range. The resonant converter includes a first circuit and a second circuit. The first circuit includes a plurality of primary-side switches. The plurality of primary-side switches includes a first high-side switch, a second high-side switch, a first low-side switch and a second low-side switch. A first terminal of the first high-side switch and a first terminal of the second high-side switch are connected to an input voltage source. A second terminal of the first high-side switch is connected to a first terminal of the first low-side switch. A second terminal of the second high-side switch is connected to a first terminal of the second low-side switch. A second terminal of the first low-side switch and a second terminal of the second low-side switch are grounded. A node between the second terminal of the first high-side switch and the first terminal of the first low-side switch is connected to a first terminal of a resonant inductor. A second terminal of the resonant inductor is connected to a first terminal of a resonant capacitor. A first terminal of a magnetizing inductor is connected to a second terminal of the resonant capacitor and a first terminal of a primary side of a transformer. A second terminal of the magnetizing inductor is connected to a node between the second terminal of the second high-side switch and the first terminal of the second low-side switch. The second terminal of the magnetizing inductor is connected to a second terminal of the primary side of the transformer. The second circuit includes a plurality of secondary-side switches. The plurality of secondary-side switches includes a third high-side switch, a fourth high-side switch, a third low-side switch and a fourth low-side switch. A first terminal of the third high-side switch and a first terminal of the fourth high-side switch are connected to a first terminal of an output capacitor and a first terminal of a resistor. A second terminal of the third high-side switch is connected to a first terminal of the third low-side switch. A second terminal of the fourth high-side switch is connected to a first terminal of the fourth low-side switch. A second terminal of the third low-side switch and a second terminal of the fourth low-side switch are connected to a second terminal of the output capacitor and a second terminal of the resistor. A node between the second terminal of the third high-side switch and the first terminal of the third low-side switch is connected to a first terminal of a secondary side of the transformer. A node between the second terminal of the fourth high-side switch and the first terminal of the fourth low-side switch is connected to a second terminal of the secondary side of the transformer. When the second low-side switch and the first low-side switch are turned on and a current time reaches a preset on time that is earlier than a time point at which the second low-side switch is turned off, the fourth high-side switch and the third low-side switch are turned on.

In certain embodiments, within a first stage time interval, the first high-side switch, the second low-side switch, the third high-side switch and the fourth low-side switch are turned on, and the first low-side switch, the second high-side switch, the third low-side switch and the fourth high-side switch are turned off.

In certain embodiments, within a second stage time interval, the second low-side switch is turned on, and the first high-side switch, the first low-side switch, the second high-side switch, the third high-side switch, the third low-side switch, the fourth low-side switch and the fourth high-side switch are turned off.

In certain embodiments, within a third stage time interval, the second low-side switch and the first low-side switch are turned on, the first high-side switch, the second high-side switch, the third high-side switch, the third low-side switch, the fourth low-side switch and the fourth high-side switch are turned off, and a current of the second circuit flows through a body diode of the third high-side switch, a body diode of the fourth low-side switch and the resistor.

In certain embodiments, within a fourth stage time interval, the second low-side switch and the first low-side switch are turned on, the first high-side switch, the second high-side switch, the third high-side switch, the third low-side switch, the fourth low-side switch and the fourth high-side switch are turned off, and the current of the second circuit flows through the output capacitor and the resistor.

In certain embodiments, the preset on time falls within a fifth stage time interval. Within the preset on time of the fifth stage time interval, the first low-side switch, the fourth high-side switch and the third low-side switch are turned on, the first high-side switch, the second high-side switch, the third high-side switch and the fourth low-side switch are turned off, and a current of the output capacitor flows from the second circuit to the first circuit.

In certain embodiments, within a sixth stage time interval, the first low-side switch, the fourth high-side switch and the third low-side switch are turned on, and the first high-side switch, the second high-side switch, the second low-side switch, the third high-side switch and the fourth low-side switch are turned off.

As described above, the present disclosure provides the resonant converter having the pre-conduction mechanism for realizing the wide output voltage range. The resonant converter of the present disclosure allows the fourth low-side switch to be switched from a zero voltage value even when phase shift angles of signals of the fourth low-side switch are large. As a result, the output voltage range and the output voltage of the resonant converter can respectively be wider and lower than those of the conventional resonant converter, and a quality factor of the resonant converter of the present disclosure is reduced. Therefore, damage in the resonant inductor and the transformer of the resonant converter can be mitigated, such that an efficiency of the resonant converter is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
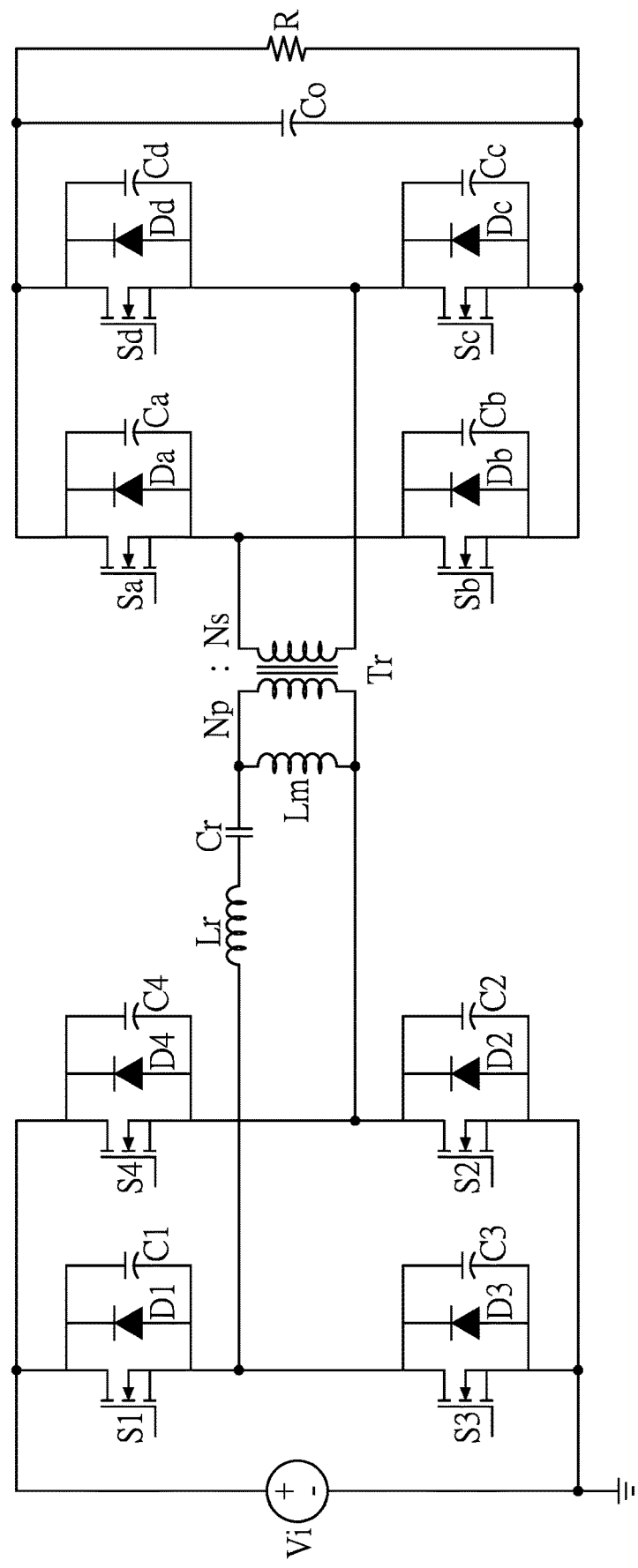
FIG. 1 is a circuit layout diagram of a resonant converter having a pre-conduction mechanism for realizing a wide output voltage range according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a resonant converter having a pre-conduction mechanism for realizing a wide output voltage range according to an embodiment of the present disclosure.

The resonant converter of the embodiment of the present disclosure is an LLC resonant converter, but the present disclosure is not limited thereto. A resonant tank of the LLC resonant converter includes a resonant inductor Lr, a resonant capacitor Cr and a magnetizing inductor Lm.

In addition, the resonant converter of the embodiment of the present disclosure may include a first circuit and a second circuit. The first circuit is a circuit at a primary side of a transformer Tr. The second circuit is a circuit at a secondary side of the transformer Tr. The first circuit includes a plurality of primary-side switches such as a first high-side switch S1, a second high-side switch S4, a first low-side switch S3 and a second low-side switch S2. The second circuit includes a plurality of secondary-side switches such as a third high-side switch Sa, a fourth high-side switch Sd, a third low-side switch Sb and a fourth low-side switch Sc.

A first terminal of the first high-side switch S1 and a first terminal of the second high-side switch S4 are connected to a positive terminal of an input voltage source Vi. A second terminal of the first high-side switch S1 is connected to a first terminal of the first low-side switch S3. A second terminal of the second high-side switch S4 is connected to a first terminal of the second low-side switch S2. A second terminal of the first low-side switch S3 and a second terminal of the second low-side switch S2 are connected to a negative terminal of the input voltage source Vi. The negative terminal of the input voltage source Vi may be grounded.

A node between the second terminal of the first high-side switch S1 and the first terminal of the first low-side switch S3 is connected to a first terminal of the resonant inductor Lr. A second terminal of the resonant inductor Lr is connected to a first terminal of the resonant capacitor Cr. A first terminal of the magnetizing inductor Lm is connected to a second terminal of the resonant capacitor Cr and a first terminal of the primary side of the transformer Tr. A second terminal of the magnetizing inductor Lm is connected to a node between the second terminal of the second high-side switch S4 and the first terminal of the second low-side switch S2. The second terminal of the magnetizing inductor Lm is connected to a second terminal of the primary side of the transformer Tr.

A first terminal of the third high-side switch Sa and a first terminal of the fourth high-side switch Sd are connected to a first terminal of an output capacitor Co and a first terminal of a resistor R. A second terminal of the third high-side switch Sa is connected to a first terminal of the third low-side switch Sb. A second terminal of the fourth high-side switch Sd is connected to a first terminal of the fourth low-side switch Sc. A second terminal of the third low-side switch Sb and a second terminal of the fourth low-side switch Sc are connected to a second terminal of the output capacitor Co and a second terminal of the resistor R.

A node between the second terminal of the third high-side switch Sa and the first terminal of the third low-side switch Sb is connected to a first terminal of the secondary side of the transformer Tr. A node between the second terminal of the fourth high-side switch Sd and the first terminal of the fourth low-side switch Sc is connected to a second terminal of the secondary side of the transformer Tr.

If necessary, the resonant converter of the embodiment of the present disclosure may further include a control circuit (not shown in figures). The control circuit may be connected to a control terminal of each of the plurality of primary-side switches and the plurality of secondary-side switches. The control circuit may turn on or off each of the plurality of primary-side switches and the plurality of secondary-side switches.

Figure 2:
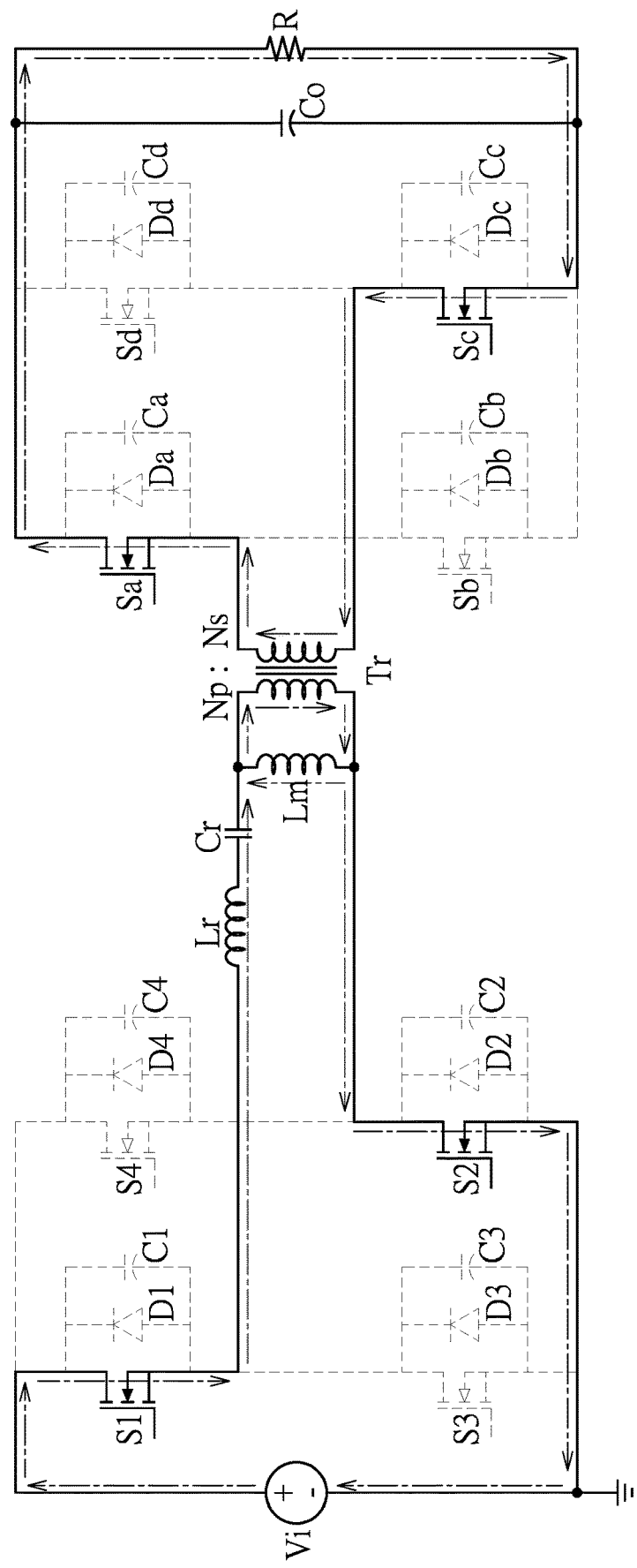
FIG. 2 is a schematic diagram of flow paths of currents of the resonant converter within a first stage time interval according to the embodiment of the present disclosure.
Figure 3:
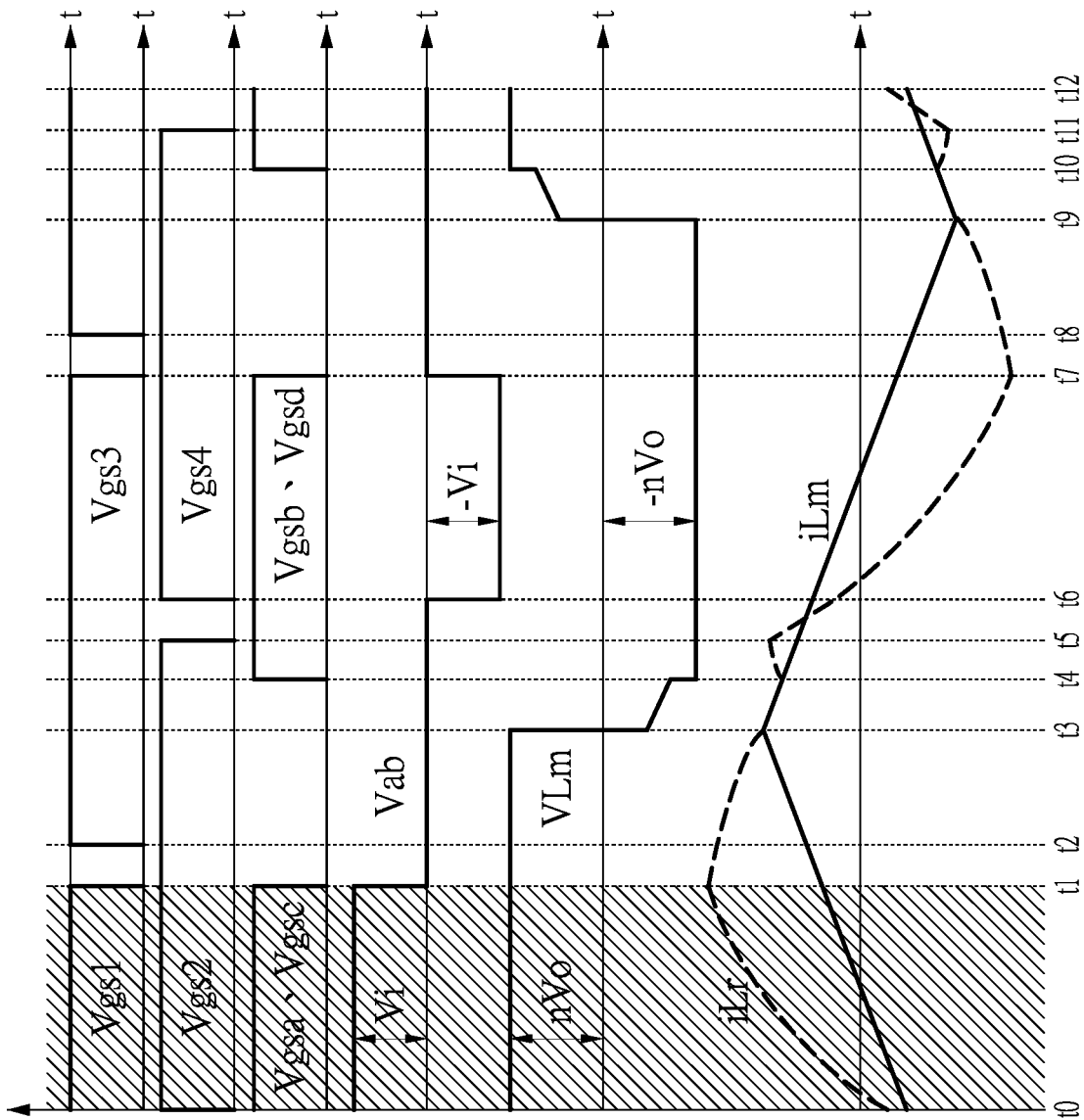
FIG. 3 is a waveform diagram of signals of the resonant converter according to the embodiment of the present disclosure.

Reference is made to FIGS. 1 to 3, in which FIG. 2 is a schematic diagram of flow paths of currents of the resonant converter within a first stage time interval according to the embodiment of the present disclosure, and FIG. 3 is a waveform diagram of signals of the resonant converter according to the embodiment of the present disclosure.

Within a first stage time interval of a time point t0 to a time point t1, a first high-side voltage signal Vgs1 of the first high-side switch S1, a second low-side voltage signal Vgs2 of the second low-side switch S2, a third high-side voltage signal Vgsa of the third high-side switch Sa and a fourth low-side voltage signal Vgsc of the fourth low-side switch Sc increase from zero voltage values to high voltage values. As a result, the first high-side switch S1, the second low-side switch S2, the third high-side switch Sa and the fourth low-side switch Sc are turned on. At the same time, the first low-side switch S3, the second high-side switch S4, the third low-side switch Sb and the fourth high-side switch Sd are turned off.

Within the first stage time interval of the time point t0 to the time point t1, a resonant inductor current iLr (that is a current of the resonant inductor Lr) gradually increases to a zero value. At this time, a flowing direction of the resonant inductor current iLr changes. The resonant inductor current iLr flows from the positive terminal of the input voltage source Vi to the resonant inductor Lr, the resonant capacitor Cr and the magnetizing inductor Lm of the resonant tank. Then, the resonant tank transmits energy from the primary side of the transformer Tr to a load. Then, an output voltage of the load is outputted to the primary side of the transformer Tr such that a magnetizing inductor voltage VLm (that is a voltage of the magnetizing inductor Lm) is clamped to a voltage nVo. A magnetizing inductor current iLm (that is a current of the magnetizing inductor Lm) increases linearly from a negative value. The magnetizing inductor current iLm transits from a low level to a high level. A flow direction of the magnetizing inductor current iLm changes.

At the time point t1, the first high-side voltage signal Vgs1 of the first high-side switch S1, the third high-side voltage signal Vgsa of the third high-side switch Sa and the fourth low-side voltage signal Vgsc of the fourth low-side switch Sc starts decreasing until reaching a zero value. As a result, the first high-side switch S1 at the primary side of the transformer Tr, and the third high-side switch Sa and the fourth low-side switch Sc at the secondary side of the transformer Tr, are turned off.

Figure 4:
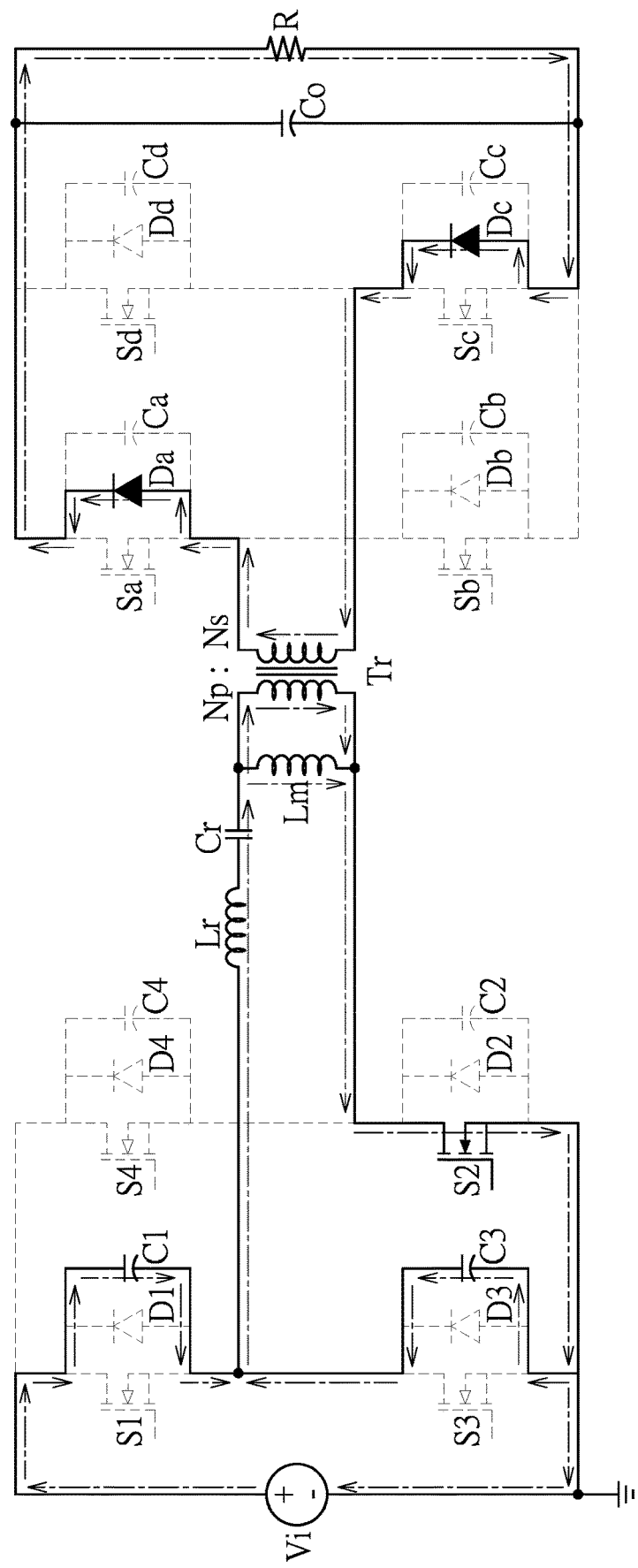
FIG. 4 is a schematic diagram of flow paths of currents of the resonant converter within a second stage time interval according to the embodiment of the present disclosure.
Figure 5:
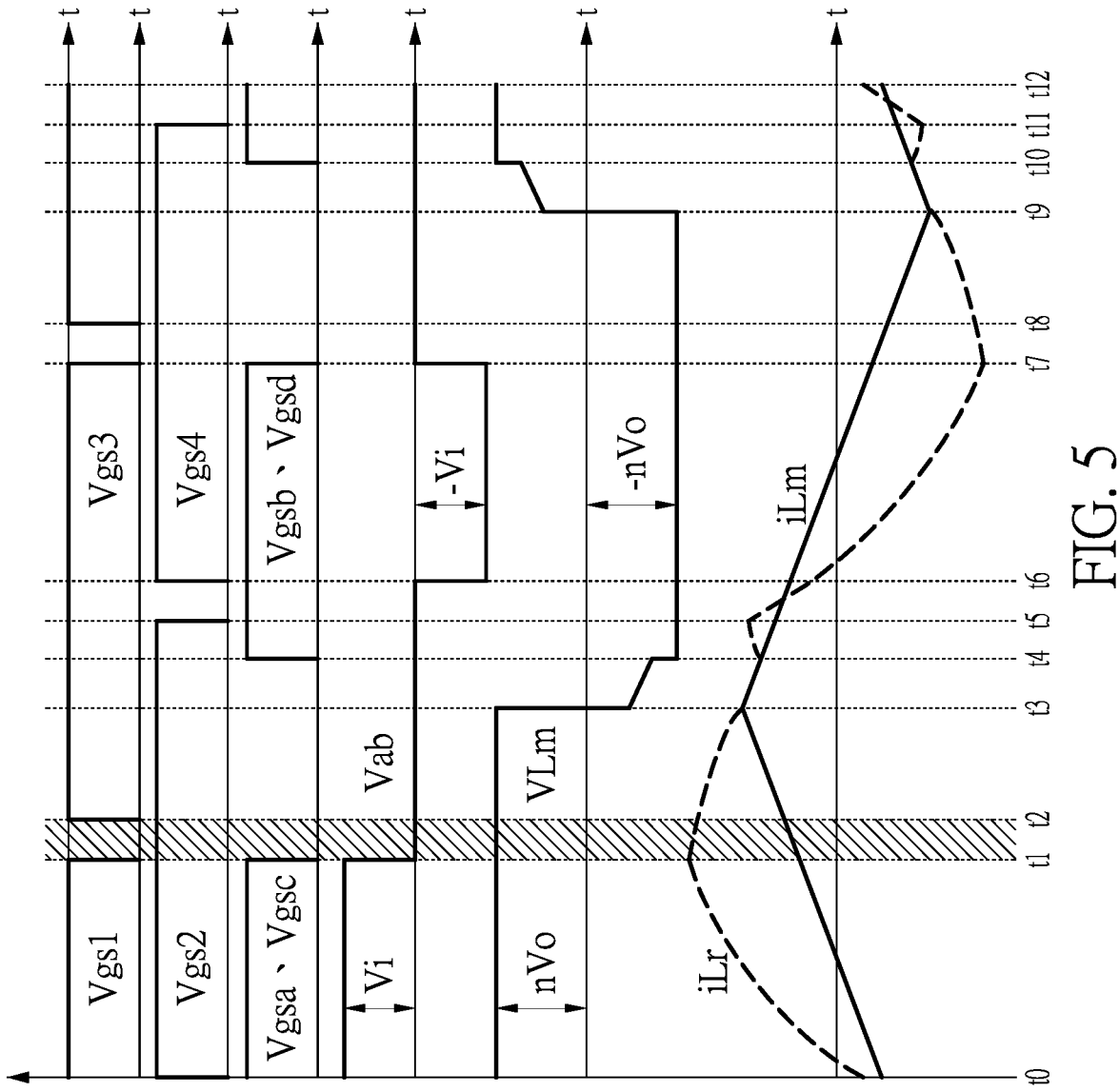
FIG. 5 is a waveform diagram of the signals of the resonant converter according to the embodiment of the present disclosure.

Reference is made to FIGS. 1, 4 and 5, in which FIG. 4 is a schematic diagram of flow paths of currents of the resonant converter within a second stage time interval according to the embodiment of the present disclosure, and FIG. 5 is a waveform diagram of the signals of the resonant converter according to the embodiment of the present disclosure.

Within a second stage time interval of the time point t1 to a time point t2, the second low-side switch S2 is turned on, and the first high-side switch S1, the first low-side switch S3, the second high-side switch S4, the third high-side switch Sa, the third low-side switch Sb, the fourth low-side switch Sc and the fourth high-side switch Sd are turned off. Under this condition, a parasitic capacitor C1 of the first high-side switch S1 is charged by the input voltage source Vi, and a parasitic capacitor C3 of the first low-side switch S3 is discharged to the input voltage source Vi, both at the primary side of the transformer Tr and within a dead time.

When the third high-side voltage signal Vgsa of the third high-side switch Sa and the fourth low-side voltage signal Vgsc of the fourth low-side switch Sc at the secondary side of the transformer Tr decrease to zero values such that the third high-side switch Sa and the fourth low-side switch Sc are turned off, the energy of the resonant tank is continually transmitted from the primary side of the transformer Tr to the load. At this time, at the secondary side of the transformer Tr, a current flows through a body diode Da of the third high-side switch Sa and a body diode Dc of the fourth low-side switch Sc to the resistor R. The output voltage of the load is outputted to the primary side of the transformer Tr such that the magnetizing inductor voltage VLm is clamped to the voltage nVo.

At the time point t2, a first low-side voltage signal Vgs3 of the first low-side switch S3 at the primary side of the transformer Tr increases from a zero voltage value to a high voltage value such that the first low-side switch S3 is turned on.

Figure 6:
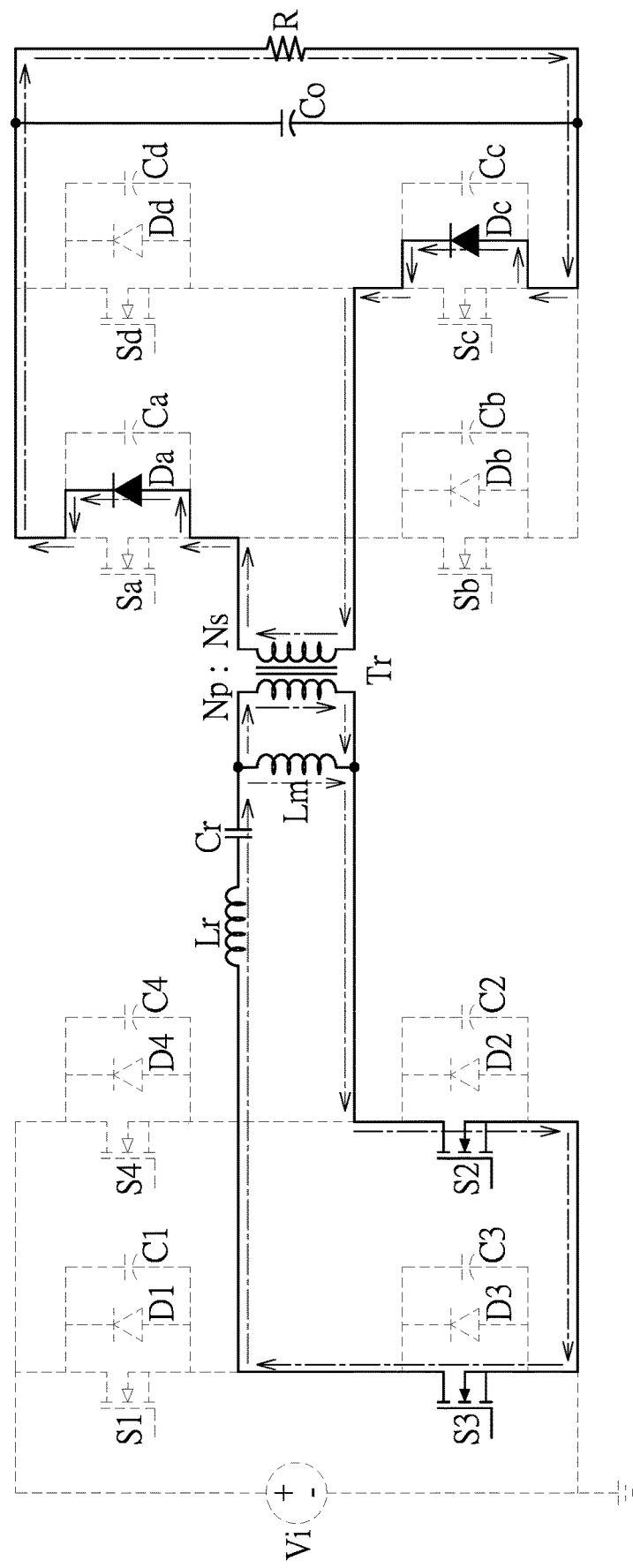
FIG. 6 is a schematic diagram of flow paths of currents of the resonant converter within a third stage time interval according to the embodiment of the present disclosure.
Figure 7:
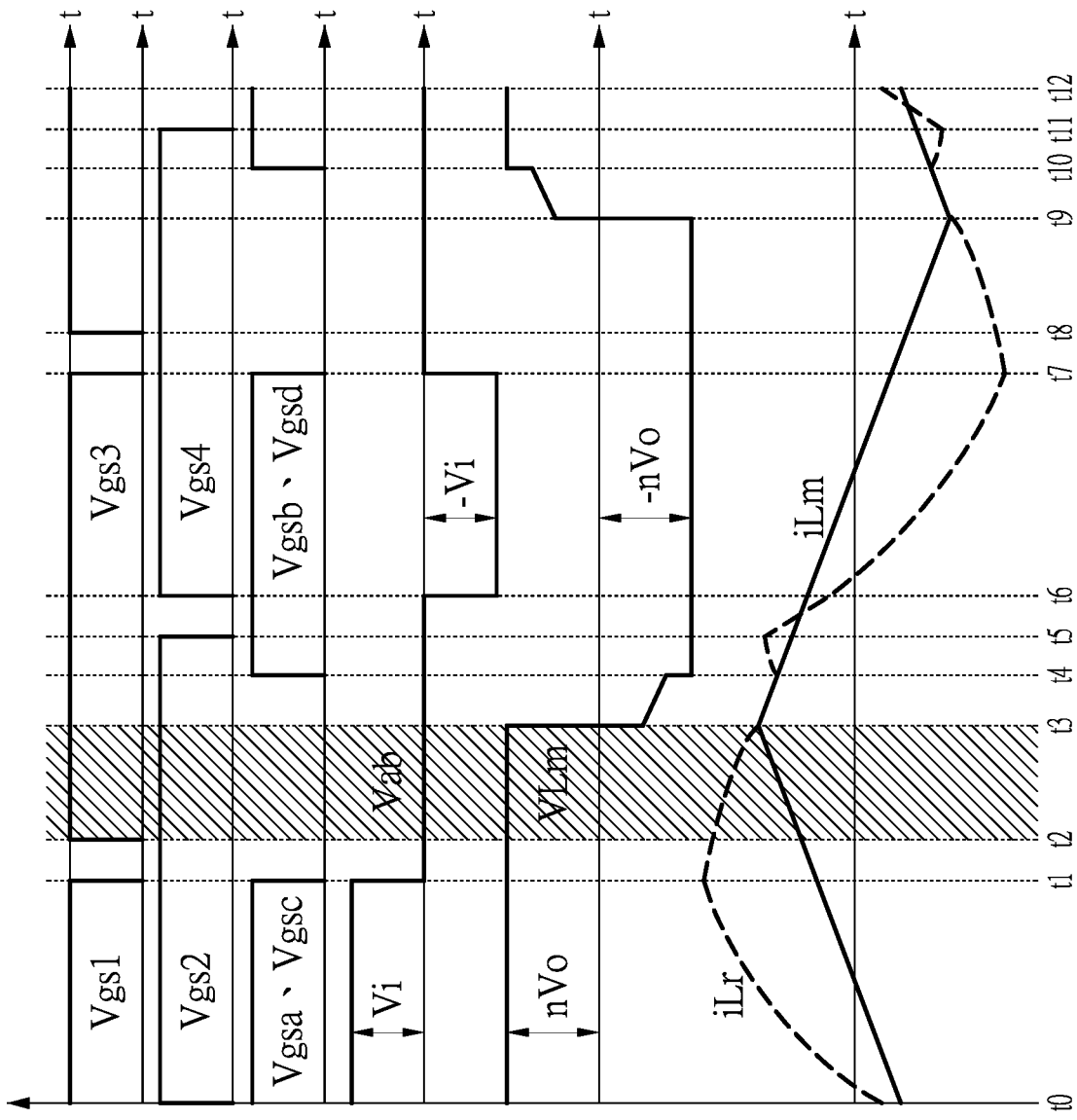
FIG. 7 is a waveform diagram of the signals of the resonant converter according to the embodiment of the present disclosure.

Reference is made to FIGS. 1, 6 and 7, in which FIG. 6 is a schematic diagram of flow paths of currents of the resonant converter within a third stage time interval according to the embodiment of the present disclosure, and FIG. 7 is a waveform diagram of the signals of the resonant converter according to the embodiment of the present disclosure.

Within the third stage time interval of the time point t2 to a time point t3, the first low-side switch S3 is turned on, the second low-side switch S2 is continually turned on, but the first high-side switch S1, the second high-side switch S4, the third high-side switch Sa, the fourth high-side switch Sd, the third low-side switch Sb and the fourth low-side switch Sc are turned off. At this time, at the secondary side of the transformer Tr, the current flows through the body diode Da of the third high-side switch Sa, the body diode Dc of the fourth low-side switch Sc and the resistor R.

Within the third stage time interval of the time point t2 to the time point t3, the energy of the resonant tank is transmitted from the primary side of the transformer Tr to the load, the current flows through the body diode Da of the third high-side switch Sa, the body diode Dc of the fourth low-side switch Sc to the resistor R, the resonant inductor current iLr continually decreases, and the output voltage of the load is outputted to the primary side of the transformer Tr such that the magnetizing inductor voltage VLm is clamped to the voltage nVo. At a time point t3, the resonant inductor current iLr decreases to be equal to the magnetizing inductor current iLm. A third stage ends at the time point t3.

Figure 8:
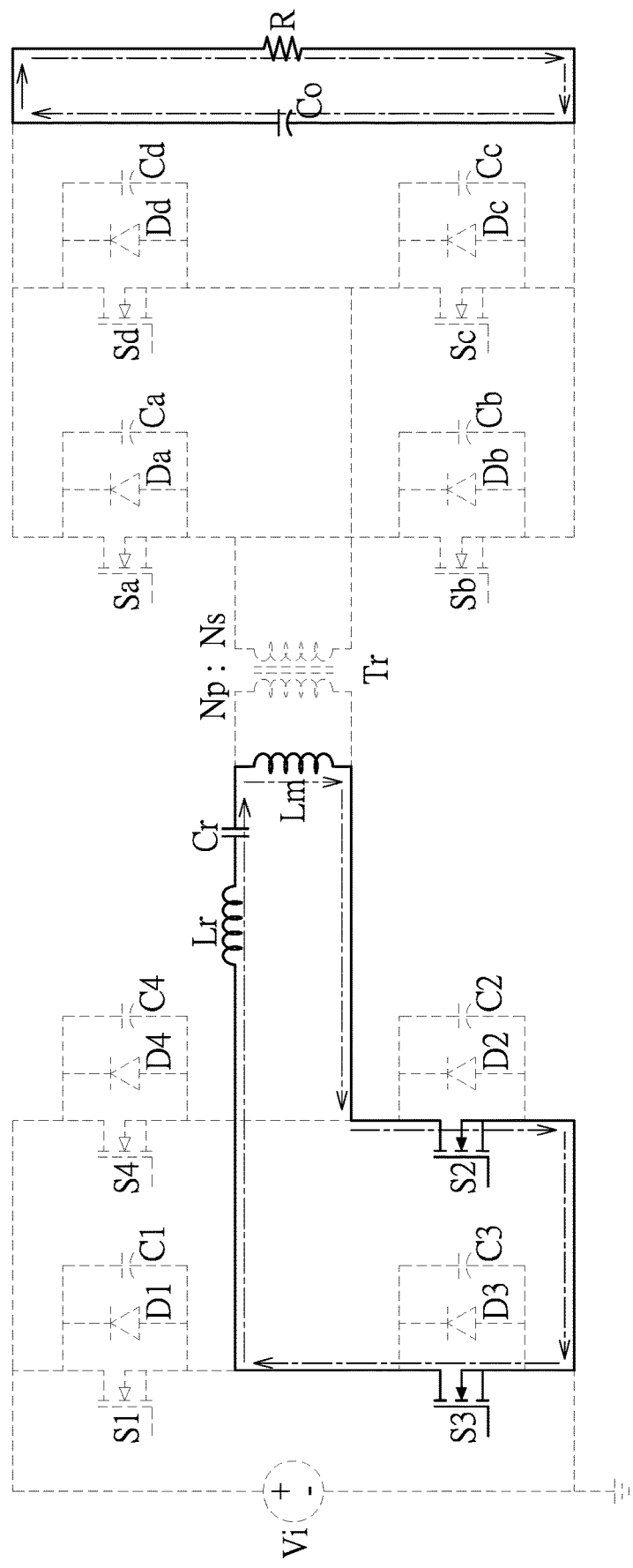
FIG. 8 is a schematic diagram of flow paths of currents of the resonant converter within a fourth stage time interval according to the embodiment of the present disclosure.
Figure 9:
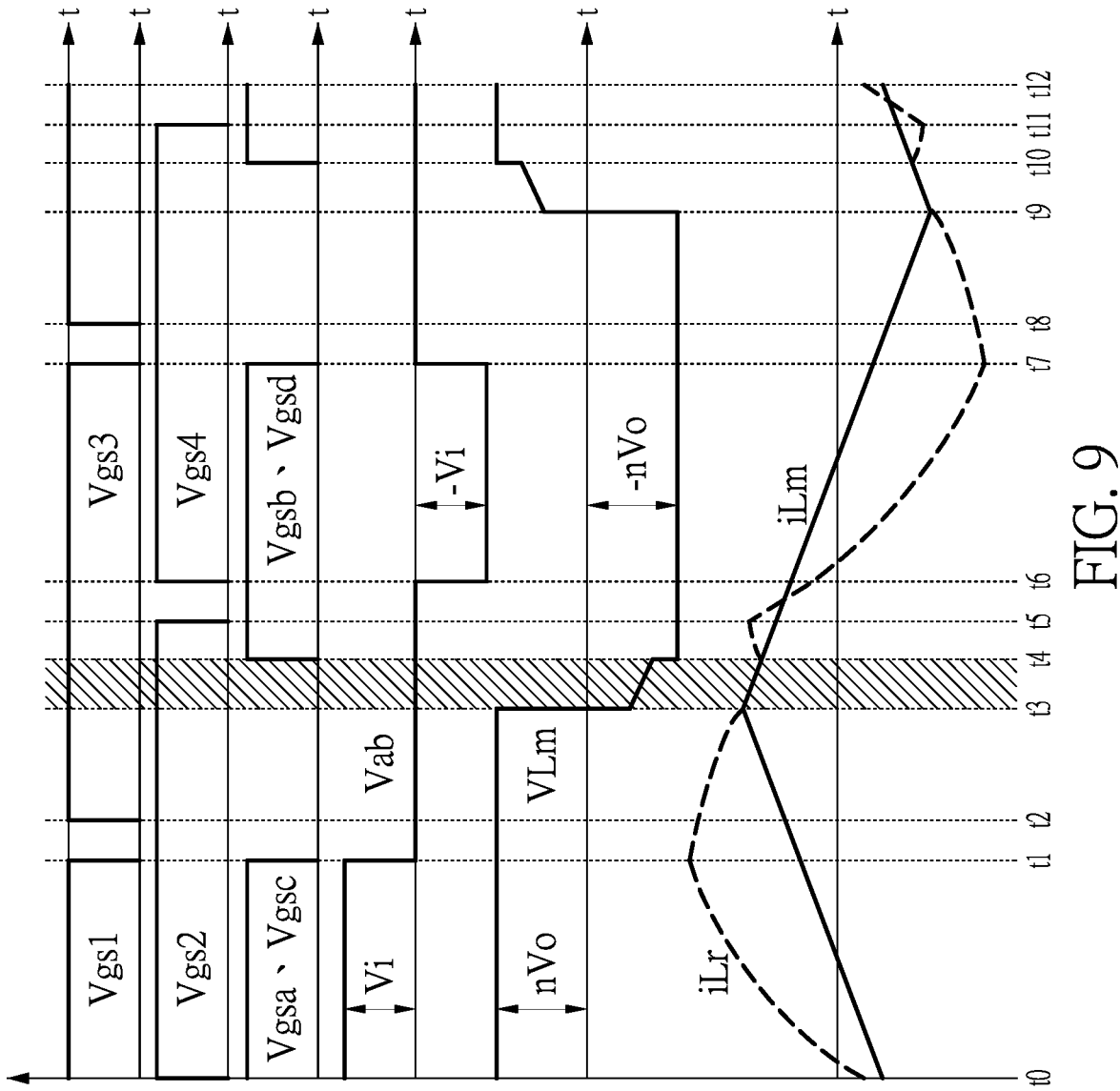
FIG. 9 is a waveform diagram of the signals of the resonant converter according to the embodiment of the present disclosure.

Reference is made to FIGS. 1, 8 and 9, in which FIG. 8 is a schematic diagram of flow paths of currents of the resonant converter within a fourth stage time interval according to the embodiment of the present disclosure, and FIG. 9 is a waveform diagram of the signals of the resonant converter according to the embodiment of the present disclosure.

Within the fourth stage time interval of the time point t3 to a time point t4, the second low-side switch S2 and the first low-side switch S3 are turned on, but the first high-side switch S1, the second high-side switch S4, the third high-side switch Sa, the third low-side switch, the fourth low-side switch Sc and the fourth high-side switch Sd are turned off.

At the time point t3, the resonant inductor current iLr decreases to be equal to the magnetizing inductor current iLm. At this time, no current flows to the primary side of the transformer Tr, and the resonant tank at the primary side of the transformer Tr cannot transmit the energy to the load. As a result, the first circuit at the primary side of the transformer Tr is uncoupled from the second circuit at the secondary side of the transformer Tr. The magnetizing inductor voltage VLm of the transformer Tr is unclamped to the voltage nVo. The resonant inductor current iLr starts to decrease. The output capacitor Co provides energy to the load. At the time point t4, the third high-side voltage signal Vgsa of the third high-side switch Sa and a fourth high-side switch Vgsd of the fourth high-side switch Sd increase from zero values such that the third high-side switch Sa and the fourth high-side switch Sd are turned on. A fourth stage ends at the time point t4.

Figure 10:
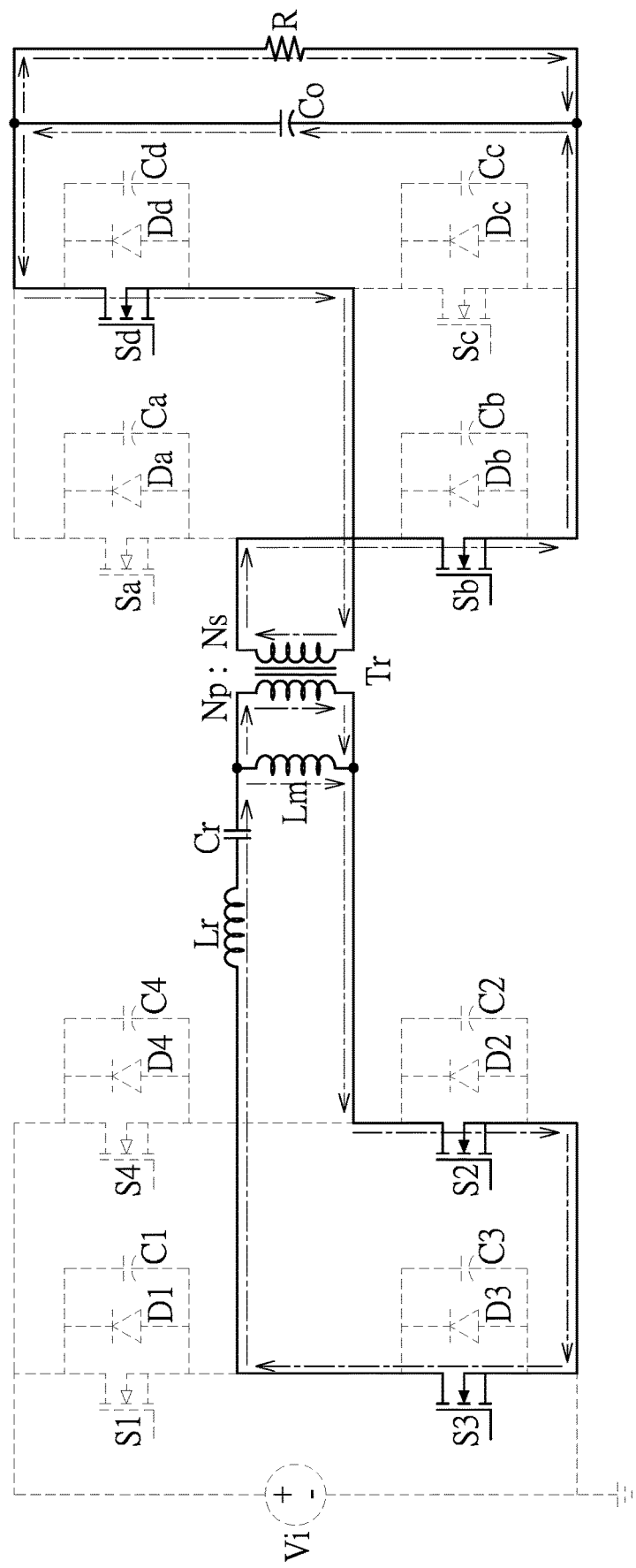
FIG. 10 is a schematic diagram of flow paths of currents of the resonant converter within a fifth stage time interval according to the embodiment of the present disclosure.
Figure 11:
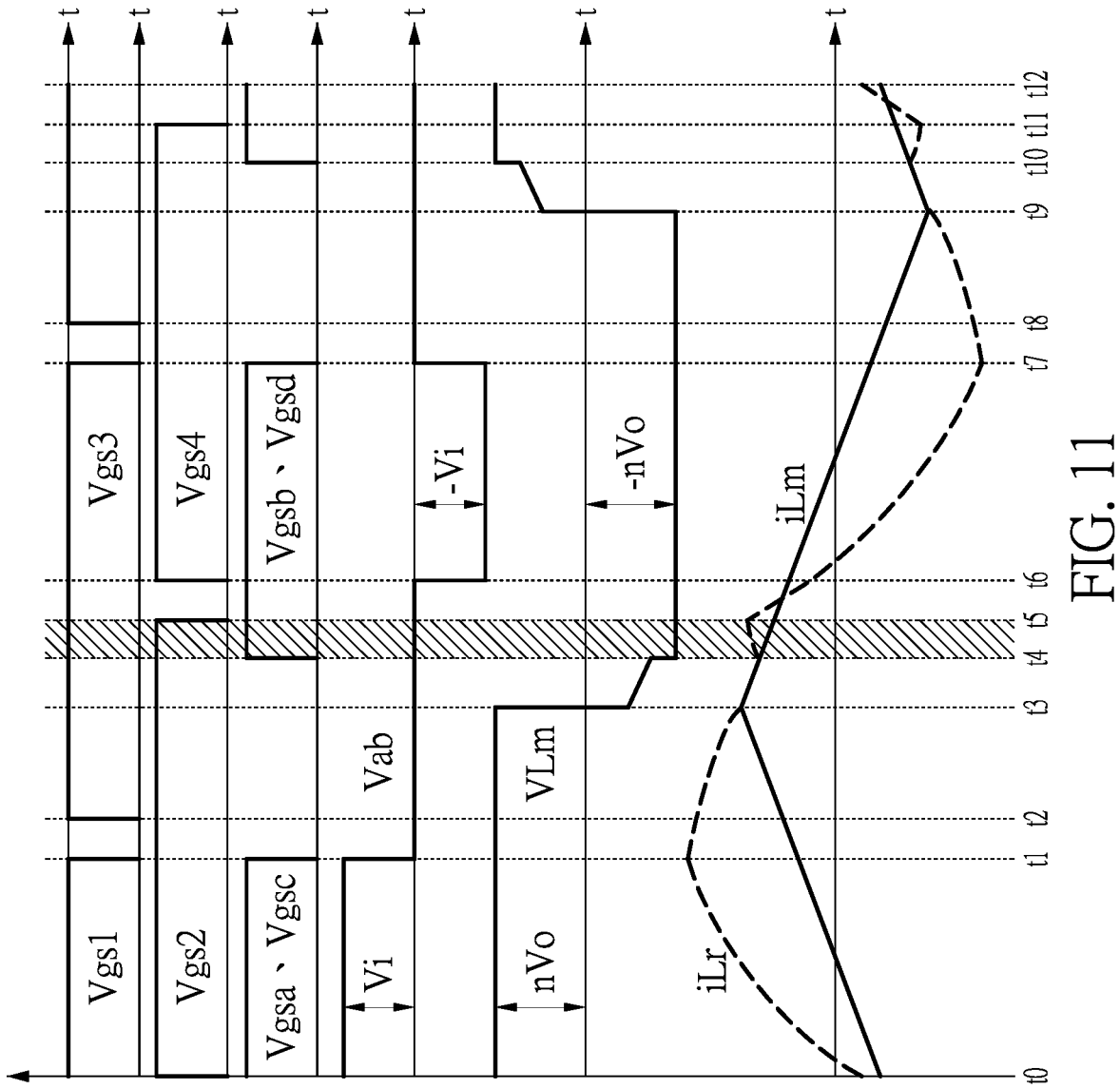
FIG. 11 is a waveform diagram of the signals of the resonant converter according to the embodiment of the present disclosure.

Reference is made to FIGS. 1, 10 and 11, in which FIG. 10 is a schematic diagram of flow paths of currents of the resonant converter within a fifth stage time interval according to the embodiment of the present disclosure, and FIG. 11 is a waveform diagram of the signals of the resonant converter according to the embodiment of the present disclosure.

It is worth noting that, within a preset on time of the fifth stage time interval of the time point t4 to a time point t5, the second low-side switch S2 and the first low-side switch S3 are turned on, the fourth high-side switch Sd and the third low-side switch Sb at the secondary side of the transformer Tr are turned on, but the first high-side switch S1, the second high-side switch S4, the third high-side switch Sa and the fourth low-side switch Sc are continually turned off. The preset on time is earlier than the time point t5 at which the second low-side switch is turned off.

When the fourth high-side switch Sd and the third low-side switch Sb are turned on, the energy of the output capacitor can be supplied to the resonant tank through the secondary-side switches being turned on. As a result, the first circuit at the primary side of the transformer Tr is compulsorily coupled with the second circuit at the secondary side of the transformer Tr. The output voltage of the load is outputted to the primary side of the transformer Tr such that the magnetizing inductor voltage VLm is clamped to a voltage -nVo. Therefore, the resonant inductor current iLr continually increases. When the resonant tank stores enough energy, the primary-side switches can be switched from zero voltages by the energy. At the time point t5, the second low-side voltage signal Vgs2 of the second low-side switch S2 at the primary side of the transformer Tr decreases to a zero value such that the second low-side switch S2 is turned off. A fifth stage ends at the time point t5.

For example, the preset on time described herein may be calculated by the following equation:

$$Ta = \frac{1}{\omega o} \sin^{-1}\left\{\left\{\frac{Zo}{-Vcr(t3) + nVo}\left[\frac{2CossVi}{Td} - iLr(t3)\right]\right\}\right\} + Td,$$

wherein Ta represents the preset on time, Zo represents an output resistance, Vcr(t3) represents a voltage of the resonant capacitor Cr at the time point t3, Coss represents a capacitance of a parasitic capacitor C2, Td represents the dead time (of the time point t5 to a time point t6), and iLr represents the resonant inductor current at the time point t3.

Figure 12:
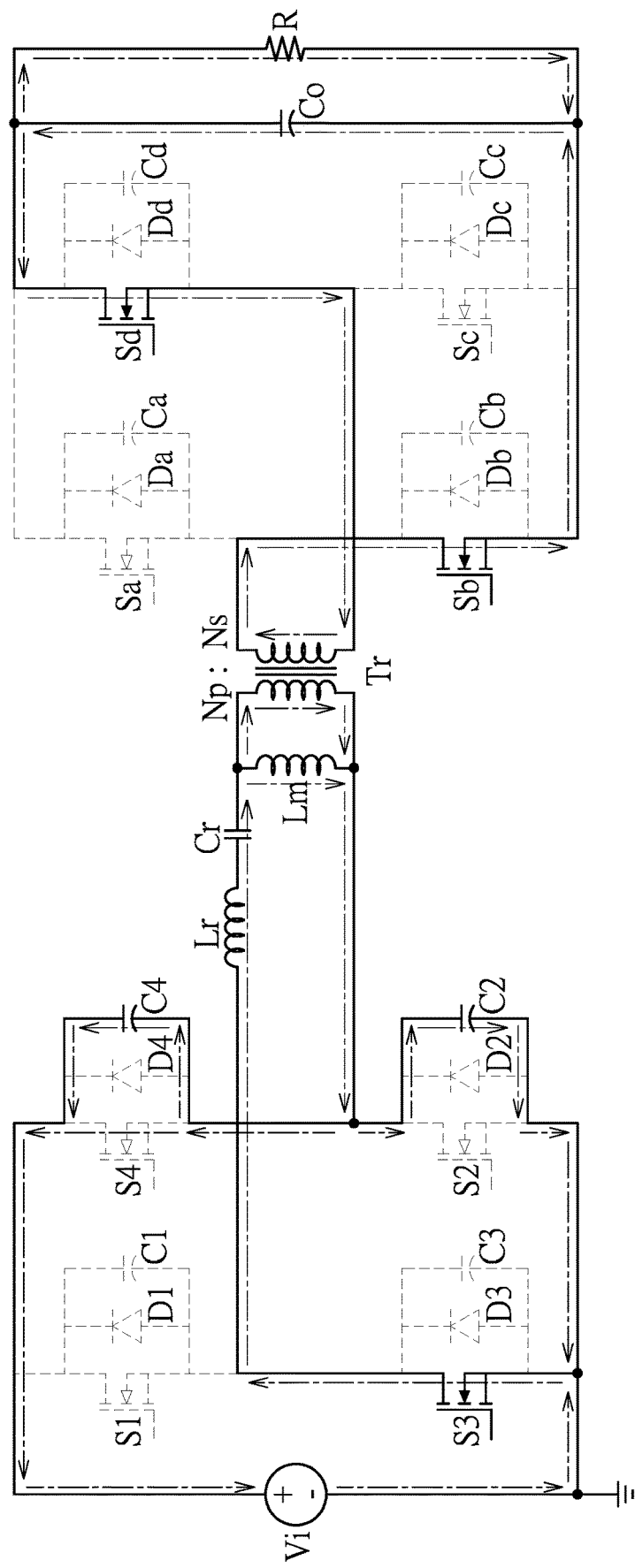
FIG. 12 is a schematic diagram of flow paths of currents of the resonant converter within a sixth stage time interval according to the embodiment of the present disclosure.
Figure 13:
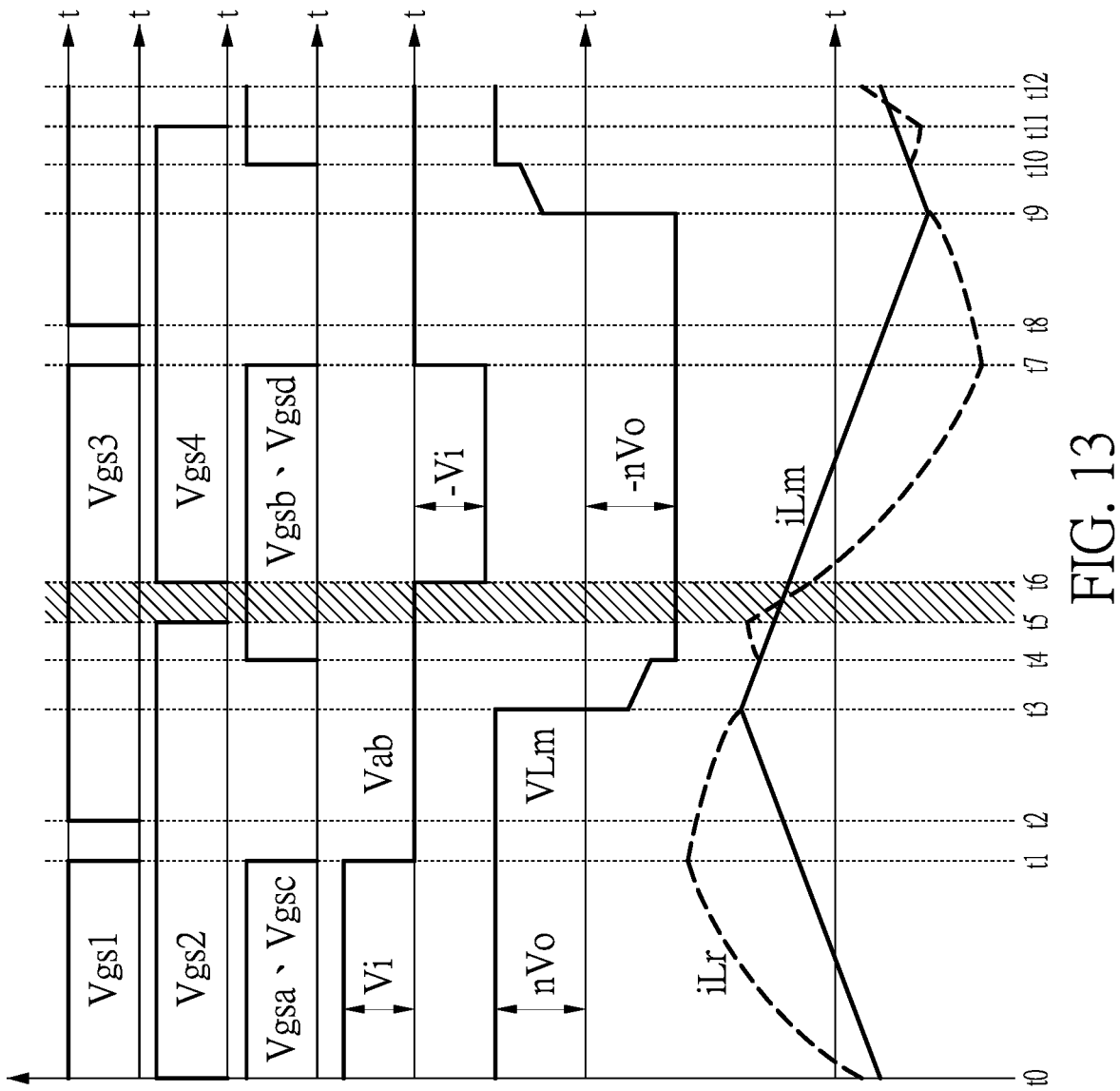
FIG. 13 is a waveform diagram of the signals of the resonant converter according to the embodiment of the present disclosure.

Reference is made to FIGS. 1, 12 and 13, in which FIG. 12 is a schematic diagram of flow paths of currents of the resonant converter within a sixth stage time interval according to the embodiment of the present disclosure, and FIG. 13 is a waveform diagram of the signals of the resonant converter according to the embodiment of the present disclosure.

Within the sixth stage time interval of the time point t5 to the time point t6, the second low-side switch S2, the fourth high-side switch Sd and the third low-side switch Sb are turned on, but the first high-side switch S1, the first low-side switch S3, the second high-side switch S4, the third high-side switch Sa and the fourth low-side switch Sc are turned off. Within the sixth stage time interval of the time point t5 to the time point t6, the resonant inductor current iLr starts to decrease. A parasitic capacitor C4 of the second high-side switch S4 is discharged to the input voltage source Vi, and the parasitic capacitor C2 of the second low-side switch S2 is charged by the input voltage source Vi, within the dead time. Then, when a voltage of the parasitic capacitor C2 of the second low-side switch S2 is charged to be equal to the input voltage source Vi and the parasitic capacitor C4 of the second high-side switch S4 is discharged to a zero value, a current flows through a body diode D4 of the second high-side switch S4 and then the second high-side switch S4 is turned on.

The energy of the resonant tank is transmitted from the primary side of the transformer Tr to the load. At the secondary side of the transformer Tr, a current flows sequentially through a body diode Db of the third low-side switch Sb being turned on and a body diode Dd of the fourth high-side switch Sd being turned on, and to the resistor R. The output voltage of the load is outputted to the primary side of the transformer Tr such that the magnetizing inductor voltage VLm is clamped to the voltage -nVo. When the fourth high-side switch Sd at the primary side of the transformer Tr is turned on from a zero voltage at the time point t6, a sixth stage ends.

Figure 14:
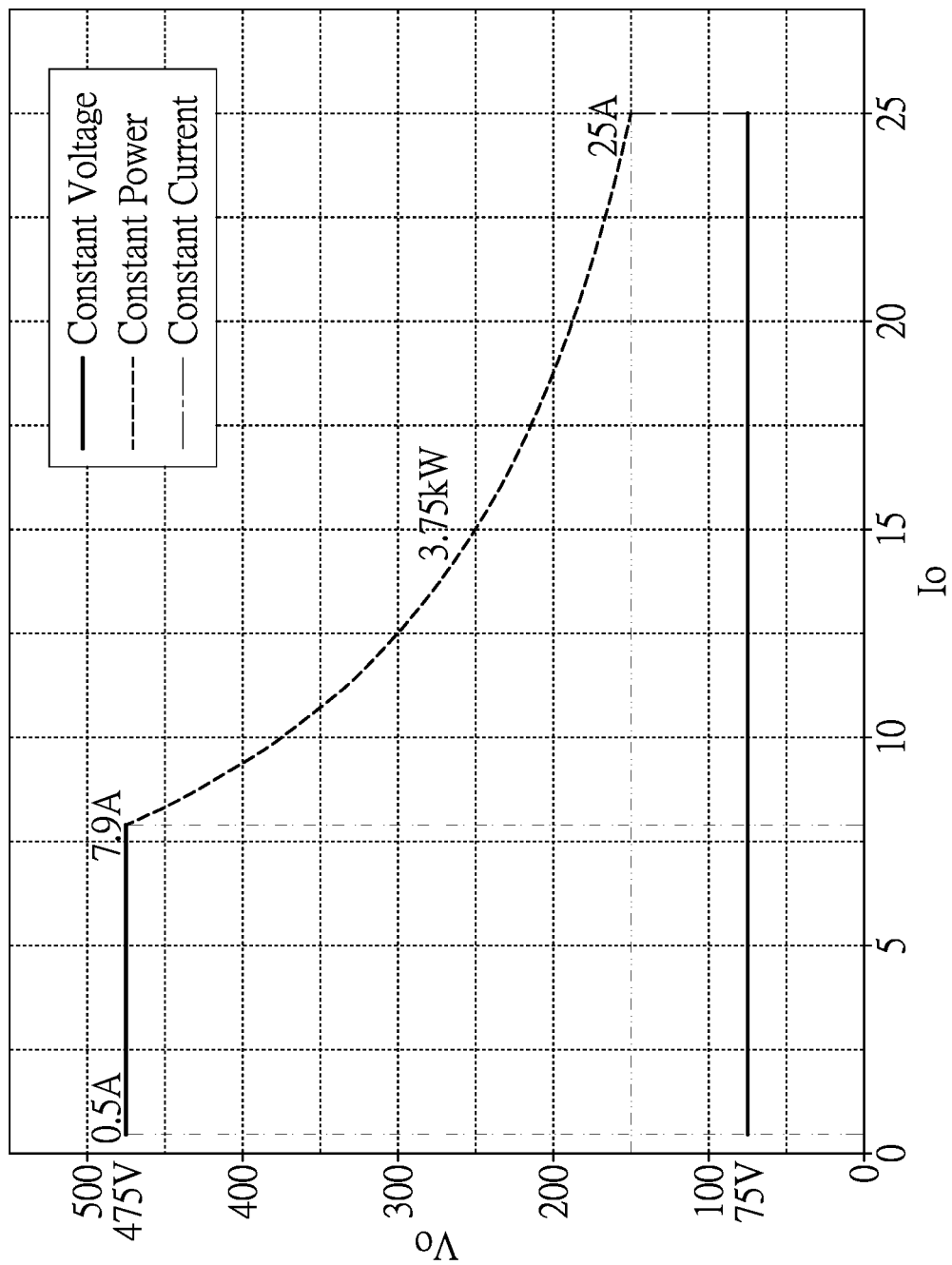
FIG. 14 is a schematic diagram of curves of the resonant converter of the embodiment of the present disclosure and a conventional resonant converter.

Reference is made to FIG. 14, which is a schematic diagram of curves of the resonant converter of the embodiment of the present disclosure and a conventional resonant converter.

For example, as shown in FIG. 14, an output voltage of the conventional resonant converter only changes within a narrow output voltage range of 150V to 475V. In contrast, in the embodiment of the present disclosure, an output voltage of the resonant converter having the pre-conduction mechanism can change within a wide output voltage range of 75V to 475V. It is therefore apparent that the resonant converter of the embodiment of the present disclosure can supply an output voltage that is lower than that of the conventional resonant converter.

In summary, the present disclosure provides the resonant converter having the pre-conduction mechanism for realizing the wide output voltage range. The fourth low-side switch can be switched from a zero voltage value, even if the phase shift angles of the signals of the fourth low-side switch are large. As a result, the output voltage range of the resonant converter is wider than that of the conventional resonant converter. The output voltage of the resonant converter can be lower than the output voltage of the conventional resonant converter. A quality factor of the resonant converter of the present disclosure is reduced. Therefore, damage in the resonant inductor and the transformer of the resonant converter is reduced such that an efficiency of the resonant converter is improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A resonant converter having a pre-conduction mechanism for realizing a wide output voltage range, comprising:
a first circuit including a plurality of primary-side switches, wherein the plurality of primary-side switches includes a first high-side switch, a second high-side switch, a first low-side switch and a second low-side switch, a first terminal of the first high-side switch and a first terminal of the second high-side switch are connected to an input voltage source, a second terminal of the first high-side switch is connected to a first terminal of the first low-side switch, a second terminal of the second high-side switch is connected to a first terminal of the second low-side switch, a second terminal of the first low-side switch and a second terminal of the second low-side switch are grounded, a node between the second terminal of the first high-side switch and the first terminal of the first low-side switch is connected to a first terminal of a resonant inductor, a second terminal of the resonant inductor is connected to a first terminal of a resonant capacitor, a first terminal of a magnetizing inductor is connected to a second terminal of the resonant capacitor and a first terminal of a primary side of a transformer, a second terminal of the magnetizing inductor is connected to a node between the second terminal of the second high-side switch and the first terminal of the second low-side switch, and the second terminal of the magnetizing inductor is connected to a second terminal of the primary side of the transformer; and
a second circuit including a plurality of secondary-side switches, wherein the plurality of secondary-side switches includes a third high-side switch, a fourth high-side switch, a third low-side switch and a fourth low-side switch, a first terminal of the third high-side switch and a first terminal of the fourth high-side switch are connected to a first terminal of an output capacitor and a first terminal of a resistor, a second terminal of the third high-side switch is connected to a first terminal of the third low-side switch, a second terminal of the fourth high-side switch is connected to a first terminal of the fourth low-side switch, a second terminal of the third low-side switch and a second terminal of the fourth low-side switch are connected to a second terminal of the output capacitor and a second terminal of the resistor, a node between the second terminal of the third high-side switch and the first terminal of the third low-side switch is connected to a first terminal of a secondary side of the transformer, and a node between the second terminal of the fourth high-side switch and the first terminal of the fourth low-side switch is connected to a second terminal of the secondary side of the transformer;

wherein, when the second low-side switch and the first low-side switch are turned on and a current time reaches a preset on time that is earlier than a time point at which the second low-side switch is turned off, the fourth high-side switch and the third low-side switch are turned on.

2. The resonant converter according to claim 1, wherein, within a first stage time interval, the first high-side switch, the second low-side switch, the third high-side switch and the fourth low-side switch are turned on, and the first low-side switch, the second high-side switch, the third low-side switch and the fourth high-side switch are turned off.

3. The resonant converter according to claim 2, wherein, within a second stage time interval, the second low-side switch is turned on, and the first high-side switch, the first low-side switch, the second high-side switch, the third high-side switch, the third low-side switch, the fourth low-side switch and the fourth high-side switch are turned off.

4. The resonant converter according to claim 3, wherein, within a third stage time interval, the second low-side switch and the first low-side switch are turned on, the first high-side switch, the second high-side switch, the third high-side switch, the third low-side switch, the fourth low-side switch and the fourth high-side switch are turned off, and a current of the second circuit flows through a body diode of the third high-side switch, a body diode of the fourth low-side switch and the resistor.

5. The resonant converter according to claim 4, wherein, within a fourth stage time interval, the second low-side switch and the first low-side switch are turned on, the first high-side switch, the second high-side switch, the third high-side switch, the third low-side switch, the fourth low-side switch and the fourth high-side switch are turned off, and the current of the second circuit flows through the output capacitor and the resistor.

6. The resonant converter according to claim 5, wherein, the preset on time falls within a fifth stage time interval, and within the preset on time of the fifth stage time interval, the second low-side switch, the first low-side switch, the fourth high-side switch and the third low-side switch are turned on, the first high-side switch, the second high-side switch, the third high-side switch and the fourth low-side switch are turned off, and a current of the output capacitor flows from the second circuit to the first circuit.

7. The resonant converter according to claim 6, wherein, within a sixth stage time interval, the first low-side switch, the fourth high-side switch and the third low-side switch are turned on, and the first high-side switch, the second high-side switch, the second low-side switch, the third high-side switch and the fourth low-side switch are turned off.

* * * * *